United States Patent
Teller et al.

(10) Patent No.: US 9,939,896 B2
(45) Date of Patent: Apr. 10, 2018

(54) INPUT DETERMINATION METHOD

(71) Applicant: Google Inc., Mountain View, CA (US)

(72) Inventors: Eric Teller, San Francisco, CA (US); Daniel Aminzade, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/208,561

(22) Filed: Jul. 12, 2016

(65) Prior Publication Data

US 2016/0320838 A1 Nov. 3, 2016

Related U.S. Application Data

(63) Continuation of application No. 13/466,673, filed on May 8, 2012, now Pat. No. 9,423,870.

(51) Int. Cl.
| | |
|---|---|
| *G10L 21/00* | (2013.01) |
| *G06F 3/01* | (2006.01) |
| *G10L 15/22* | (2006.01) |
| *G06F 3/16* | (2006.01) |
| *G06F 3/0481* | (2013.01) |

(52) U.S. Cl.
CPC ............ *G06F 3/013* (2013.01); *G06F 3/0481* (2013.01); *G06F 3/167* (2013.01); *G10L 15/22* (2013.01); *G10L 2015/223* (2013.01)

(58) Field of Classification Search
CPC ..................................................... G06F 3/013
USPC ....................................................... 704/275
See application file for complete search history.

(56) References Cited

U.S. PATENT DOCUMENTS

| | | | |
|---|---|---|---|
| 4,852,988 | A | 8/1989 | Velez et al. |
| 5,689,619 | A | 11/1997 | Smyth |
| 5,844,824 | A | 12/1998 | Newman et al. |
| 5,859,663 | A | 1/1999 | Simon |
| 5,867,308 | A | 2/1999 | Pensel et al. |

(Continued)

FOREIGN PATENT DOCUMENTS

| | | |
|---|---|---|
| EP | 2325722 | 5/2011 |
| WO | 2010051037 | 5/2010 |
| WO | 2011044435 A1 | 4/2011 |

OTHER PUBLICATIONS

Berger, "Eye Gaze Activated Voice Recognition Control System", Feb. 4, 2005, 4 pages, Siemens Communications, Inc., Mountain View, CA.

(Continued)

*Primary Examiner* — Jakieda Jackson
(74) *Attorney, Agent, or Firm* — McDonnell Boehnen Hulbert

(57) ABSTRACT

Methods and systems for determining intent in voice and gesture interfaces are described. An example method includes determining that a gaze direction is in a direction of a gaze target, and determining whether a predetermined time period has elapsed while the gaze direction is in the direction of the gaze target. The method may also include providing an indication that the predetermined time period has elapsed when the predetermined time period has elapsed. According to the method, a voice or gesture command that is received after the predetermined time period has elapsed may be determined to be an input for a computing system. Additional example systems and methods are described herein.

17 Claims, 9 Drawing Sheets

(56) References Cited

U.S. PATENT DOCUMENTS

| | | | |
|---|---|---|---|
| 6,459,446 B1 | 10/2002 | Harman | |
| 6,603,491 B2 | 8/2003 | Lemelson et al. | |
| 6,637,883 B1 | 10/2003 | Tengshe et al. | |
| 6,795,806 B1 | 9/2004 | Lewis et al. | |
| 6,847,336 B1 | 1/2005 | Lemelson et al. | |
| 7,192,136 B2 | 3/2007 | Howell et al. | |
| 7,255,437 B2 | 8/2007 | Howell et al. | |
| 7,380,936 B2 | 6/2008 | Howell et al. | |
| 7,386,799 B1 | 6/2008 | Clanton et al. | |
| 7,401,918 B2 | 7/2008 | Howell et al. | |
| 7,438,410 B1 | 10/2008 | Howell et al. | |
| 7,438,414 B2 | 10/2008 | Rosenberg | |
| 7,481,531 B2 | 1/2009 | Howell et al. | |
| 7,500,746 B1 | 3/2009 | Howell et al. | |
| 7,500,747 B2 | 3/2009 | Howell et al. | |
| 7,532,197 B2 | 5/2009 | Clement et al. | |
| 7,543,934 B2 | 6/2009 | Howell et al. | |
| 7,581,833 B2 | 9/2009 | Howell et al. | |
| 7,621,634 B2 | 11/2009 | Howell et al. | |
| 7,677,723 B2 | 3/2010 | Howell et al. | |
| 7,760,898 B2 | 7/2010 | Howell et al. | |
| 7,771,046 B2 | 8/2010 | Howell et al. | |
| 7,792,552 B2 | 9/2010 | Thomas et al. | |
| 7,806,525 B2 | 10/2010 | Howell et al. | |
| 7,922,321 B2 | 4/2011 | Howell et al. | |
| 8,109,629 B2 | 2/2012 | Howell et al. | |
| 8,745,058 B1 | 6/2014 | Garcia-Barrio | |
| 2002/0010589 A1 | 1/2002 | Nashida et al. | |
| 2004/0193413 A1* | 9/2004 | Wilson | G06F 3/017 704/243 |
| 2005/0001981 A1 | 1/2005 | Anderson et al. | |
| 2005/0243054 A1 | 11/2005 | Beymer | |
| 2006/0192775 A1 | 8/2006 | Nicholson et al. | |
| 2007/0011609 A1 | 1/2007 | Adjouadi et al. | |
| 2007/0024579 A1 | 2/2007 | Rosenberg | |
| 2007/0040892 A1 | 2/2007 | Aoki et al. | |
| 2008/0060497 A1 | 3/2008 | Lambert et al. | |
| 2008/0297589 A1 | 12/2008 | Kurtz et al. | |
| 2009/0022368 A1 | 1/2009 | Matsuoka et al. | |
| 2010/0045596 A1 | 2/2010 | Deleon | |
| 2010/0189354 A1 | 6/2010 | de Campos et al. | |
| 2010/0219683 A1 | 9/2010 | Stoner et al. | |
| 2010/0254609 A1 | 10/2010 | Chen et al. | |
| 2011/0018903 A1 | 1/2011 | Lapstun et al. | |
| 2011/0019874 A1 | 1/2011 | Jarvenpaa et al. | |
| 2011/0054909 A1 | 3/2011 | Bruekers et al. | |
| 2011/0068921 A1 | 3/2011 | Shafer | |
| 2011/0084840 A1 | 4/2011 | Mercier et al. | |
| 2011/0109880 A1 | 5/2011 | Nummela | |
| 2011/0141011 A1* | 6/2011 | Lashina | G06F 3/013 345/156 |
| 2011/0199202 A1 | 8/2011 | DeMers et al. | |
| 2011/0213664 A1 | 9/2011 | Osterhout et al. | |
| 2011/0270123 A1 | 11/2011 | Reiner | |
| 2012/0007772 A1 | 1/2012 | Parssinen et al. | |
| 2012/0044365 A1 | 2/2012 | Shuster | |
| 2012/0062445 A1 | 3/2012 | Haddick et al. | |
| 2012/0078623 A1 | 3/2012 | Vertegaal et al. | |
| 2012/0086345 A1 | 4/2012 | Tran | |
| 2012/0105486 A1 | 5/2012 | Lankford | |
| 2012/0169582 A1* | 7/2012 | Tschirhart | G02B 27/01 345/156 |
| 2012/0203086 A1 | 8/2012 | Rorabaugh et al. | |
| 2012/0259638 A1 | 10/2012 | Kalinli | |
| 2012/0295708 A1* | 11/2012 | Hernandez-Abrego | A63F 13/424 463/36 |
| 2013/0084970 A1 | 4/2013 | Geisner et al. | |
| 2013/0265227 A1 | 10/2013 | Julian | |
| 2014/0092268 A1 | 4/2014 | Cleveland | |
| 2015/0109191 A1* | 4/2015 | Johnson | G10L 15/22 345/156 |

OTHER PUBLICATIONS

Related U.S. Appl. No. 13/398,148, filed Feb. 16, 2012.
Office Action from related U.S. Appl. No. 13/398,148 dated Apr. 30, 2012.
Office Action from related U.S. Appl. No. 13/398,148 dated Oct. 12, 2012.
Office Action from related U.S. Appl. No. 13/398,148 dated Mar. 25, 2013.
Office Action from related U.S. Appl. No. 13/398,148 dated Apr. 29, 2014.
Office Action from related U.S. Appl. No. 13/398,148 dated Aug. 11, 2014.
Sun, Yi et al., Automatic Pose Estimation of 3D Facial Models, Computer Science Department, State University of New York at Binghamton, 2008 International Conference on Pattern Recognition (ICPR), Dec. 8-11, 2008.

* cited by examiner

Computer Program Product 900

Signal Bearing Medium 901

Program Instructions 902

- determining that a gaze direction is in a direction of a gaze target;

- determining whether a predetermined time period has elapsed while the gaze direction is in the direction of the gaze target;

- providing an indication that the predetermined time period has elapsed when the predetermined time period has elapsed; and

- determining a voice command that is received after the predetermined time period has elapsed is an input for a computing system.

| Computer Readable Medium 903 | Computer Recordable Medium 904 | Communications Medium 905 |

FIGURE 9

INPUT DETERMINATION METHOD

CROSS-REFERENCE TO RELATED APPLICATIONS

This application is a continuation of U.S. patent application Ser. No. 13/466,673 filed on May 8, 2012, the contents of which are hereby incorporated by reference.

BACKGROUND

Voice-user interfaces, sometimes referred to as speech-driven interfaces, enable human interaction with a variety of devices. Example devices include televisions, computers, mobile devices, or other voice-controlled devices. In one example, a voice or speech platform of a device may use speech recognition technology to facilitate initiation of an automated service or process based on received voice inputs. For example, a user may speak a command and the command may be translated into an input (e.g., text) that can be interpreted by components of the device. Potential applications of voice-user interfaces include use in automotive, military, or healthcare environments, as well as gaming systems, household electronics or appliances, and mobile devices, among other possibilities.

In some examples, a triggering action may be performed or automatically recognized by a device to commence interaction with a voice-user interface. For instance, a user may press a button, perform a predetermined gesture (e.g., raise a microphone or phone to their head), or speak a predetermined command (e.g., "Computer!") prior to issuing a voice command, and the triggering action may be interpreted by the device as an indication to start listening for voice commands. Other examples of triggering actions for voice-user interfaces are also possible. Similarly, other types of user interfaces, such as interfaces configured to determine a hand gesture or head gesture as an input instead of or in addition to voice inputs, may also utilize triggering actions.

SUMMARY

In one example aspect, a method is provided that involves determining a gaze direction is in a direction of a gaze target, and determining whether a predetermined time period has elapsed while the gaze direction is in the direction of the gaze target. The method may further include providing an indication that the predetermined time period has elapsed when the predetermined time period has elapsed. According to the method, a voice command that is received after the predetermined time period has elapsed may be determined to be an input for a computing system.

In another example aspect, a non-transitory computer-readable medium having stored therein instructions executable by a computing device to cause the computing device to perform functions is provided. The functions may include determining a gaze direction is in a direction of a gaze target, and determining whether a predetermined time period has elapsed while the gaze direction is in the direction of the gaze target. The functions may further include providing an indication that the predetermined time period has elapsed when the predetermined time period has elapsed. According to the functions, a voice command that is received after the predetermined time period has elapsed may be determined to be an input for a computing system.

In still another example aspect, a system is provided that includes a gaze tracking component, a voice input component, an indicator component, and instructions stored in a memory and executable by a processor. The gaze tracking component may be configured to determine a gaze direction, and the voice input component may be configured to receive a voice command. The instructions stored in the memory may be executable by the processor to perform functions comprising determining the gaze direction is in a direction of a gaze target, and determining whether a predetermined time period has elapsed while the gaze direction is in the direction of the gaze target. The functions may further include causing the indicator component to provide an indication that the predetermined time period has elapsed when the predetermined time period has elapsed. According to the functions, a voice command that is received after the predetermined time period has elapsed may be determined to be an input for the system.

In still another example aspect, a method is provided that involves determining a gaze direction is in a direction of a gaze target, and determining whether a predetermined time period has elapsed while the gaze direction is in the direction of the gaze target. The method may further include providing an indication that the predetermined time period has elapsed when the predetermined time period has elapsed. According to the method, a gesture that is received after the predetermined time period has elapsed may be determined to be an input for a computing system.

In yet another example aspect, a non-transitory computer-readable medium having stored therein instructions executable by a computing device to cause the computing device to perform functions is provided. The functions may include determining a gaze direction is in a direction of a gaze target, and determining whether a predetermined time period has elapsed while the gaze direction is in the direction of the gaze target. The functions may further include providing an indication that the predetermined time period has elapsed when the predetermined time period has elapsed. According to the functions, a gesture that is received after the predetermined time period has elapsed may be determined to be an input for a computing system.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 9 is a schematic illustrating a conceptual partial view of an example computer program product that includes a computer program for executing a computer process on a computing device, arranged according to at least some embodiments presented herein.

DETAILED DESCRIPTION

Figure 1:
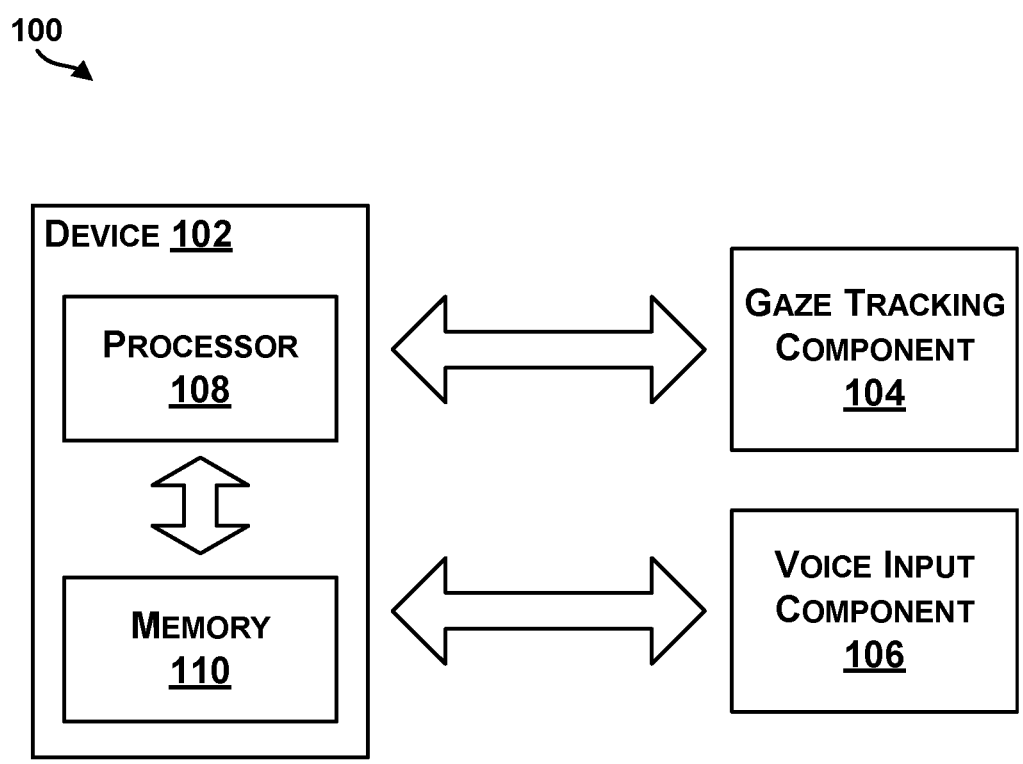
FIG. 1 illustrates an example system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

This disclosure may disclose, inter alia, methods and systems for determining intent to interact based on sustained eye gaze. In some speech-driven or gesture-driven interfaces, it is important to distinguish between background speech (e.g., conversations amongst people in a room or voices from a television or radio) or actions and explicit commands directed at a device. A triggering action may be used to indicate to a device to start listening for voice commands or recognizing gesture inputs. The methods and systems disclosed herein describe example implementations for use of sustained eye gaze as a triggering action for voice and gesture interfaces.

For instance, a user may look at a gaze target and hold their gaze for an amount of time prior to issuing a voice command. In some instances, any utterances spoken without first initiating this "eye contact" with the gaze target may be ignored. Additionally, in some instances, audio localization may be used to filter sound not emanating from the direction of the user looking at the gaze target.

In voice interfaces where users give spoken commands to a television, computer, or other voice-controlled device, it may be useful to distinguish between background speech (such as conversations between people in the room, or voices from a television) and speech that is intended to control the device. Therefore, a triggering action may be used to indicate to the computer that it should begin listening, so that the computer does not interpret background chatter as commands. According to the described systems and methods, sustained eye gaze with a gaze target may be used as such a trigger. For example, a user may look at the computer or another gaze target and hold his gaze for a short time before issuing a voice command. Any utterances spoken without first gazing at the gaze target may be ignored. In addition, in some examples, audio localization may also be used to filter sound not emanating from the direction of the person gazing at the gaze target. Alternatively, sound that is not coming from the direction of the person gazing at the gaze target may be ignored instead of actively filtered out acoustically.

As a specific example, a user may be watching television while conversing with another user. In one instance, the user may lock their gaze with the television to activate voice control for the television. For example, the user may sustain their gaze in the direction of the television for a brief period of time until an indication is provided that the television has recognized the intent to active the voice control. After the indication is provided, the user may speak a voice command (e.g., "Turn to Channel 5" or "Show me the weather forecast for today"). In some scenarios, the use of a sustained eye gaze in the direction of the television as a triggering action may be a quick and easy way to indicate when speech should be interpreted as a voice input. Additionally, the use of sustained eye gaze as a trigger may allow the user to otherwise carry on a conversation with another user without worrying about inadvertently changing the channel or turning off the television.

The above example is but one of many applications of methods and systems described herein. It and the other examples described herein are provided for illustrative purposes and are not intended to be limiting. Although the systems and methods are described with respect to voice and gesture interfaces, the systems and methods may also be applicable to other types of interfaces. The term speaker is also not meant to be limiting. For example, a user that is providing a gesture may also be described as a speaker.

II. Example Systems

Referring now to the figures, FIG. 1 illustrates an example system 100. The system 100 may include a device 102, a gaze tracking component 104, and a voice input component 106. In one example, the gaze tracking component 104 and the voice input component 106 may communicate with the device 102 via wired or wireless communication. Alternatively, the gaze tracking component 104 and/or the voice input component 106 may be integrated components of the device 102.

The device 102 may be any type of device capable of receiving inputs from a speech-driven interface. For example, the device 102 may include a voice-user interface or be capable of receiving inputs (e.g., text) from a voice-user interface. As any example, the device 102 may be a television, computer (such as a laptop computer, desktop computer, mobile computer, tablet computer, etc.), gaming console, mobile device (such as a wearable computing device or mobile phone), audio and/or video player, multimedia player, appliance (such as a refrigerator, microwave, coffee maker), or other voice-controlled device.

The device 102 may comprise a processor 108 and a memory 110. The processor 108 may be any type of processor, such as a microprocessor, digital signal processor, multicore processor, etc., coupled to the memory 110. The memory 110 may be any type of memory, such as volatile memory like random access memory (RAM), dynamic random access memory (DRAM), and static random access memory (SRAM), or non-volatile memory like read-only memory (ROM), flash memory, magnetic or optical disks, and compact-disc read-only memory (CD-ROM), among other devices used to stored data or programs on a temporary or permanent basis.

The gaze tracking component 104 may be an imaging device configured to determine information associated with one or more gaze directions. For example, the gaze tracking component 104 may be a camera or video camera configured to obtain images of one or more people facing the camera. In another example, the gaze tracking component 104 may include a range camera configured to determine movement or depth information in three dimensions. For example, the gaze tracking component may obtain a 3D image comprising a point cloud.

The gaze tracking component 104 may provide information such as images to the device 102. In one example, the device 102 (or a processing device associated with the gaze tracking component 104) may run a face detection algorithm to determine a three-dimensional (3D) pose(s) of one or more people in an image. A 3D pose may include a position and orientation of a face in an image. For instance, a face detection algorithm may detect a face in an image and determine an in-plane rotation and/or out-of-plane rotation of the face with respect to an axis between the face and the viewpoint of an imaging device used to obtain the image. The method for 3D pose estimation may be model-based and/or face property-based. An example algorithm for geometry based pose estimation may estimate pose orientation of a face by detecting the positions of both eye inner corners and the nose tip. For instance, one may assume that a head pose can uniquely be determined based on the three points (i.e., the two inner eye corners and the nose tip). However other example algorithms may also be used, as will be understood by one of ordinary skill in the art.

In other examples, the gaze tracking component 104 may be configured to obtain eye tracking information that may be used instead of or in addition to face detection or 3D pose detection techniques to determine a gaze direction. For instance, light (such as infrared light) may be reflected from a user's eye and sensed by a camera or other type of optical sensor. The reflection information may be provided to the device 102 (or a component of the gaze tracking component 104) to determine eye rotation information based on changes in the reflection information. Eye tracking techniques for determining the eye rotation information may be Bright Pupil or Dark Pupil, for example. In one instance, the gaze tracking component 104 may include a head-mounted device having a camera that is configured to determine the eye tracking information.

The voice input component 106 may be an input device configured to receive and record audio information (such as spoken words) or receive and provide the audio information to the device 102. For example, the voice input component 106 may be configured to convert sound into an electric signal. As an example, the voice input component 106 may be a microphone or other type of acoustic-to-electric transducer or sensor. In one instance, the voice input component 106 may include a variety of microphones operating in tandem, such as a microphone array. For example, the microphone array may include multiple omnidirectional or directional microphones.

In one example, information from the microphone array may be processed by the device 102 or a component of the voice input component 106 to interpret the results into a coherent form. For instance, a sound source or direction to a sound source may be determined based on the information from the microphone array using audio localization (or acoustic source localization). Different methods for obtaining either source direction or source location are possible. One example method includes using time difference of arrival to determine a beam angle to the loudest source of audio. Other methods may measure acoustic particle velocities or intensity vectors.

In examples herein, the system 100 of FIG. 1 may be used to determine speaker intent in voice interfaces.

III. Example Method

Figure 2:
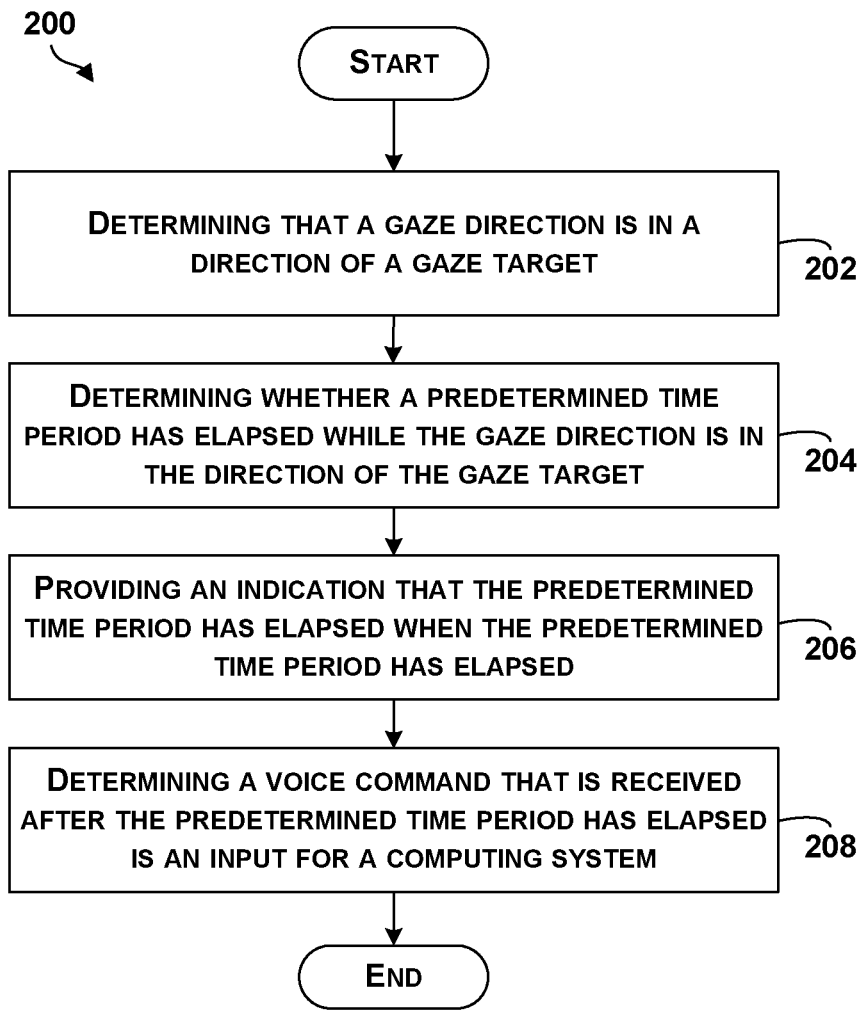
FIG. 2 is a block diagram of an example method for determining speaker intent.

FIG. 2 is a block diagram of an example method 200 for determining speaker intent. Method 200 shown in FIG. 2 presents an embodiment of a method that could be used by the system 100 of FIG. 1 or components of the system 100, for example. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable media, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable medium may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

Initially, at block 202, the method 200 includes determining that a gaze direction is in a direction of a gaze target. In some examples, a gaze tracking device such as a camera may be used to obtain an image of people in a field of view of the camera. The image may be processed to determine a gaze direction of one or more users in the image. For example, a face may be detected in the image and a 3D pose of the face may be determined. The gaze direction may be assumed to be aligned with the 3D pose in some instances.

Alternatively, eye tracking methods may be used to determine a gaze direction of user based on information associated with eye rotations of a user. In some applications, determining that a gaze direction is in a direction of a gaze target may not involve determining a specific direction. Rather, determining that a gaze direction is in a direction of a gaze target may include detecting a pupil in an image, and interpreting the presence of the pupil as an indication that a gaze of a user is in the direction of a gaze target. For example, in the case of a water dispenser of a refrigerator door, detecting an eye and/or pupil in a frame of a video obtained by a camera in the refrigerator door for longer than a predetermined time period may activate voice control of the water dispenser. This may be beneficial, for example, because a user would likely not be looking at the refrigerator door (or at a portion of the refrigerator door in which the water dispenser is located) for any other reason.

In one instance, the gaze direction may be compared to an expected angle from an origin of the gaze direction to a location of the gaze target. In some examples, the gaze target may be a location of a gaze tracking device. For example, a user may gaze at a camera. In other examples, the gaze target may be a physical or virtual target at a location separate from the gaze tracking device. For instance, the gaze tracking device may be a printed or rendered image, an image that is projected onto a surface, or a known position with respect to the gaze tracking device. For example, a camera may be placed on top of a television, and the gaze target may be the center of the television.

Given information about the location of the gaze target, a processor may determine an expected angle that a user would need to hold in order to look at the gaze target. For example, a processing component may calculate a 3D pose or eye gaze direction a user would need to hold in order to look at the gaze target based on a position of a face or eyes in the image. Given information associated with a distance to a face of a user, trigonometry may be used to calculate the 3D pose or eye gaze direction that the user would need to hold. In one instance, depth information, such as information obtained using multiple cameras or other types of depth sensors may be used to accurately determine a distance to a face of the user. In another instance, a distance to a face of a user may be estimated based on a size of the face in the image. For example, based on the assumption that most heads are close to the same size, a size of the face or distance between facial features of the face may be used to determine a distance. In still another instance, a parallax from multiple images and the movement of a user may be used to estimate a distance to the user. In one example, a gaze direction may be determined to be in a direction of the gaze target if the gaze direction is within a predetermined threshold or range of the expected angle of the expected angle (e.g., within plus or minus five degrees of pan, tilt, or roll).

At block 204, the method 200 includes determining whether a predetermined time period has elapsed while the gaze direction is in the direction of the gaze target. For example, if a gaze direction is determined to be in the direction of the gaze target, a second determination may be made to determine how long a gaze direction has been in the direction of the gaze target. The length of time that the gaze direction has been in the direction of the gaze target may be compared with the predetermine time period, and a decision may be made based on the comparison.

At block 206, the method 200 includes providing an indication that the predetermined time period has elapsed when the predetermined time period has elapsed. For instance, based on the comparison between an amount of time the gaze direction has been in the direction of the gaze target and the predetermine time period, it may be determined that the gaze direction has been in the direction of the gaze target for longer than the predetermined time period. According to the method 200, an indication may be provided. In some examples, the indication may be a visual indication at a location of the gaze target. For example, the gaze target may be a camera, and a light-emitting diode (LED) adjacent to the camera may be caused to illuminate or blink. In other instances, the indication may be an audible indication. For instance, a tone or alarm may be provided using a speaker.

In some instances, the indication may be indicative that a user has achieved gaze-lock. For example, after a user has sustained their gaze in the direction of the gaze target for longer than the predetermined time period, the indication may be provided as feedback to the user indicating that future voice commands issued by the user may be interpreted by a computing system as an input. One example indication may involve causing a predetermined pattern of blinking for one or more LEDs. Another example may include simply causing an LED to turn on. In yet another example, the indication may be text or a graphic displayed on a screen indication that a voice-input mode has been activated. Other example indications are also possible.

At block 208, the method 200 includes determining a voice command that is received after the predetermined time period has elapsed is an input for a computing system. In one example, if it is determined that a gaze direction has been sustained in the direction of the gaze target for longer than the predetermined time period, the computing system may begin to process voice commands as inputs for the computing system.

In some examples, a user may issue voice commands, and the voice commands may be interpreted as inputs for the computing system as long as the user maintains their gaze direction in the direction of the gaze target. In other examples, a user may be able to issue voice commands for a period of time after initiating gaze-lock regardless of whether the user maintains their gaze in the direction of the gaze target. For example, the computing system may process any voice commands received within two seconds after providing an indication that a user has achieved gaze lock. In one example scenario, if it is determined that a user's gaze is no longer in the direction of the gaze target and the period of time after initiating gaze-lock has expired, the method 200 may restart and voice commands may no longer be processed by the system.

In yet another example, the system may allow a user to issue voice commands and listen for voice commands as long as the system continues to detect speech. For example, the system may listen for the presence of voice commands, and stop listening for voice commands if a predetermined amount of time has elapsed with no speech having been detected. In a further example, the system may stop listening for voice commands if a predetermined amount of time has elapsed since the system has recognized a portion of speech that can be interpreted as a voice command. For instance, speech related to a user starting up a conversation may be detected, but the system may not be able to interpret an appropriate voice command based on the detected speech. As a result, the detected speech related to the conversation may not extend or reset the predetermined time period for listening for voice commands, and the system may stop listening for voice commands.

In other examples, the system may allow a user that has achieved gaze-lock to provide other types of inputs instead of or in addition to a voice input. For instance, the system may be configured to recognize hand gestures (e.g., a motion with a hand or predetermined orientation/arrangement of fingers of a hand) or head gestures (e.g., a vertical nod to confirm or horizontal shake to negate) as inputs to the system. According to the method 200, a performed gesture that is recognized after having achieved gaze-lock may be determined to be an input, while other gestures performed without initiating gaze-lock or after a predetermined time period since having achieved gaze-lock has expired may be ignored.

In one instance, the system may be configured to recognize one or more predetermined hand or head gestures. For example, hand gestures may be determined by detecting and tracking positions of finger(s) and/or hand(s). As an example, a user may wave their hand to indicate a command for the system. In one instance, sign language may be recognized as input. In other examples, head gestures may be determined based on changes in pose orientation of a face. For example, a user may confirm or reject an option by nodding or shaking their head, and a pattern of head pose orientations may be compared with stored patterns that may be recognized as inputs for the system.

In a further example, the method 200 may also incorporate audio localization as an additional means of filtering false voice commands. For instance, a microphone array may determine a direction to a source of a voice command, and the direction to the source of the voice command may be compared to an origin of the gaze direction to determine whether audio information received by the computing system should be interpreted as a voice command. In some examples, a time difference of arrival technique may be used to determine a beam angle or direction to a source of the voice command. In one scenario, the direction to the source of the voice command may be from a left half of a room and the gaze direction which has achieved gaze-lock may be from a right half of the room. Accordingly, the method 200 may determine that the voice command was not from a user who has achieved gaze-lock and should not be interpreted as a voice command for the computing system. Additional examples as well as applications of the method 200 may be possible, such as the applications described with reference to FIGS. 3-7 below.

IV. Applications of the Example Method

As noted above, an example method may be implemented to determine speaker intent in voice interfaces. Various types of products may make use of a sustained gaze in the direction of a gaze target as a triggering action for activating voice control of the product. For example, a television, Blu-ray player, or a gaming console may utilize the example method to determine when to listen for voice commands or interpret detected speech as voice commands for the product. Perhaps a device enabling universal control of the television, Blu-ray player, and gaming console may offer a common gaze target with which a user may direct their gaze to active voice control for any connected device. It is also contemplated that computers, such as laptop computers, desktop computers, tablet computers, etc., may implement the method to determine when to interpret voice commands as commands for controlling a computer. In other examples, applications such as refrigerators, washers and dryers, or automobile electronics systems may also make use of a detected sustained eye gaze with a gaze target as a triggering action for activating a voice control mode. Various other example types of products are also possible.

Figure 3:
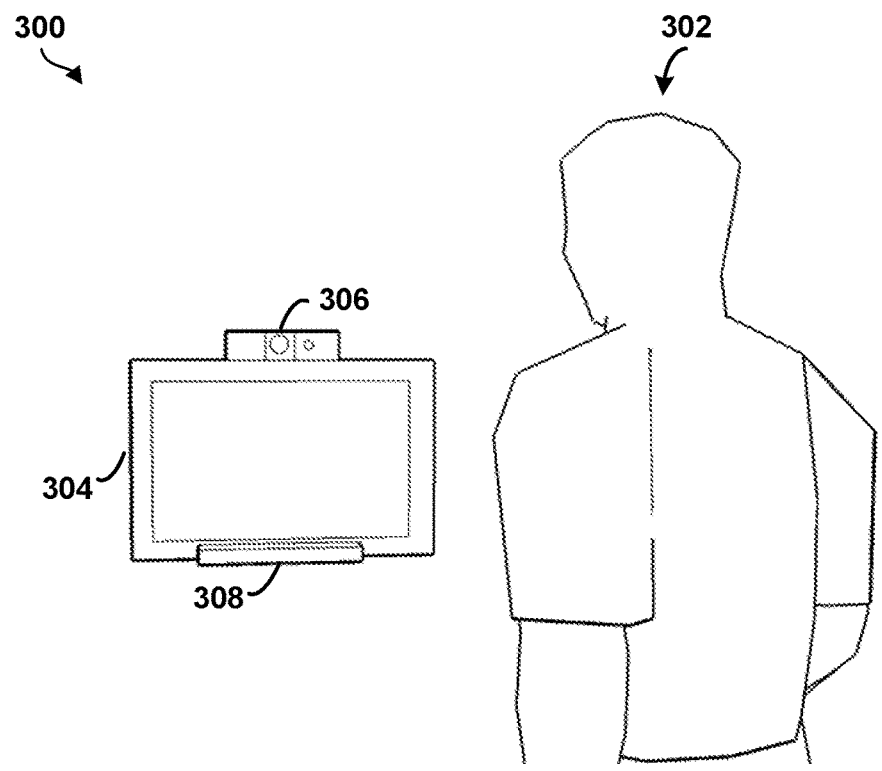
FIG. 3 illustrates an example conceptual illustration of determining a gaze direction.
Figure 3:
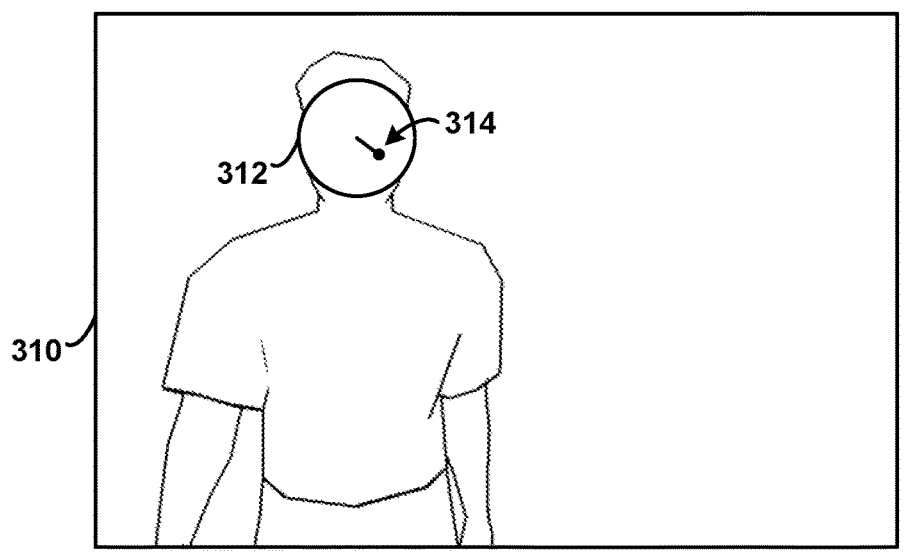

FIG. 3 illustrates an example conceptual illustration 300 of determining a gaze direction. As shown in FIG. 3, a user 302 may interact with a computing device 304 (e.g., a television or computer) using a voice-user interface. In one example, the user 302 may be within a field of view of a gaze tracking component 306 coupled to the computing system 304. For instance, the gaze tracking component 306 may be an imaging device that is positioned adjacent to or on top of the computing device 304 or may be an imaging device that is part of the computing device 304 (such as an integrated webcam).

A microphone 308 may also be coupled to the computing device 304 and may be configured to receive or record audio information such as voice commands. In some examples, the microphone 308 may be a microphone array. The microphone 308 may also be a component that is optionally integrated with the gaze tracking component 306 within a common enclosure.

The conceptual illustration 300 also includes an example image 310. In one example, the image 310 may be an image that was obtained by the gaze tracking device 306 and analyzed by a processing component of the gaze tracking component 306 or the computing device 304 to determine gaze direction information. As shown in the image 310, a gaze direction of the user 302 may have been determined. In the image 310, an ellipse 312 indicates a region of the image 310 that has been determined to be a face of the user 302. Additionally, a vector 314 emanating from the center of the ellipse 312 indicates a 3D pose of the face.

In some examples, the vector 314 may be determined to be the gaze direction. The vector 314 may be compared to an expected angle that would be expected for a user at the position of the ellipse 312 in the image 310. For example, if the computing device 304 and/or the gaze tracking component 306 are aware of the position of the gaze target with respect to the position of the gaze tracking component 306, the computing device 304 may determine an expected angle for a given portion of the image 310. If the gaze target is the gaze tracking component 306, the computing device 304 may determine that a vector that is oriented straight forward (i.e., normal to a plane of the image 310) would be expected for an ellipse in the center of the image 310. In one instance, the computing device 304 may calculate an expected angle for the ellipse 312 based on a horizontal and vertical position of the ellipse 312 within the image 310. As a simplified example, because the ellipse 312 is in an upper-left quadrant of the field of view of the gaze tracking component 306, an angle with a downward component and a rightward component with respect to a vector that is normal to the plane of the image 310 may be expected.

Figure 4:
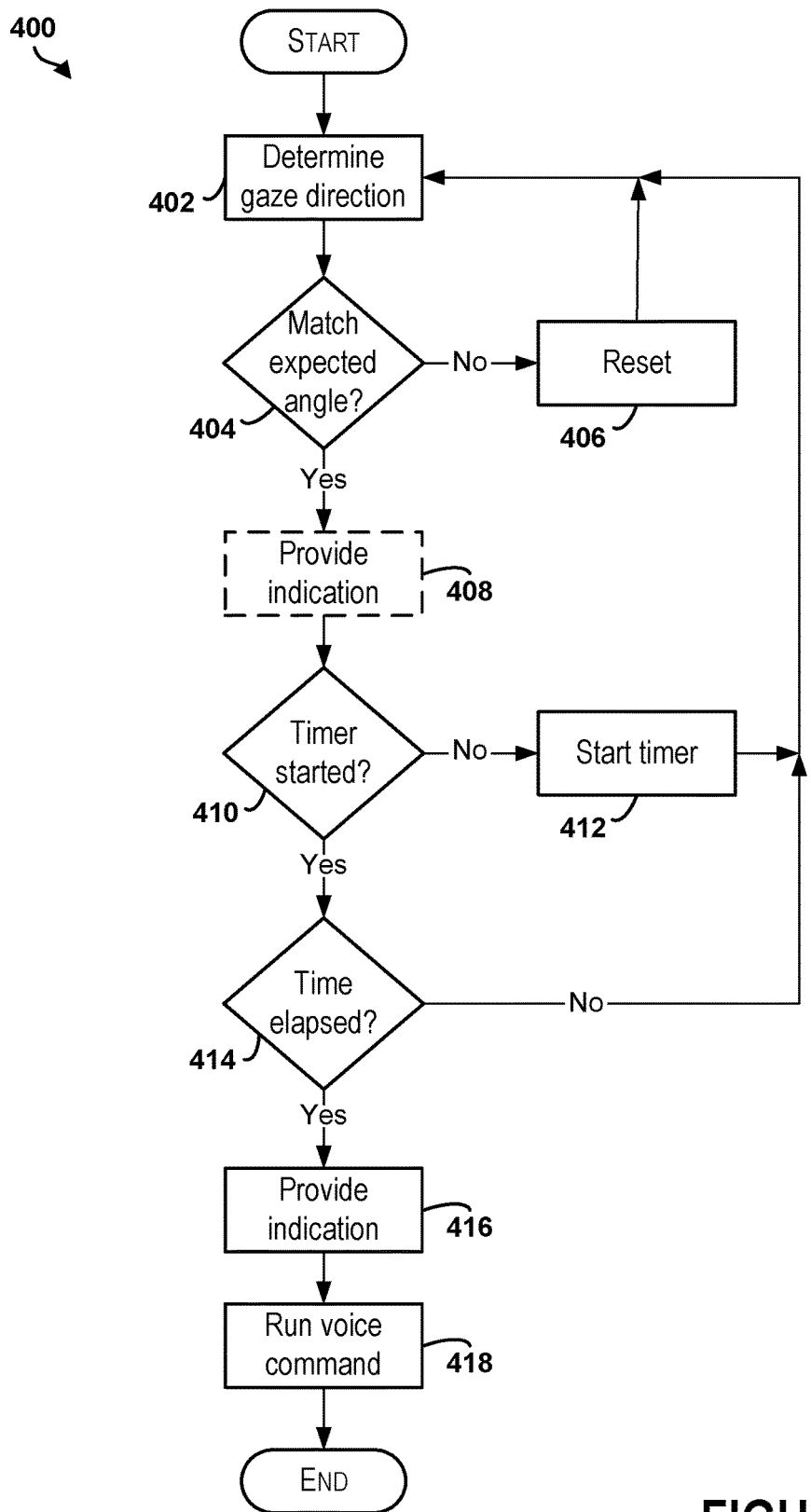
FIG. 4 is a flow chart of an example method for determining speaker intent.

FIG. 4 is a flow chart of an example method 400 for determining speaker intent. Initially, at block 402, a gaze direction is determined. For example, a gaze tracking component may obtain an image, and a gaze direction may be determined for one or more users within the image. At block 404, a determination may be made whether any of the identified gaze directions match a direction to a gaze target. In one example, the determination may be made based on a comparison of a determined gaze direction and an expected angle a user would need to hold to look at the gaze target based on a position of the user.

If it is determined that the gaze direction does not match the expected angle, at block 406, the method 400 may be reset. For example, any timers that have been set may be reset to zero and/or any indications that have been provided may be caused to stop (e.g., if one or more LEDs are blinking, the LEDs may no longer blink after the reset at block 406). The method 400 may subsequently return to block 402, where subsequent gaze directions may be determined.

For instance, another image may be obtained by the gaze tracking component and processed to determine another gaze direction. In one example, if it is determined that the gaze direction does match the expected angle (e.g., if the gaze direction is within a predetermined threshold of the expected angle), optionally an indication may be provided at block 408. For example, the indication may be a visual indication such as an illumination or blinking of one or more LEDs or may be an audible indication. In one instance, the indication at block 408 may be indicative that a user's gaze direction has been determined to be in the direction of the gaze target by a computing system.

Subsequently, at block 410, a determination may be made based on whether or not a timer has been started. If the timer has not been started, at block 412, a timer may be started, and the method 400 may return to block 402. If the timer had been previously started and the gaze direction is still determined to be in the direction of the gaze target, at block 414, a determination may be made whether a predetermined time period elapsed. For instance, the predetermined time period may be an amount of time (such as one second, 20 frames of a video sequence, etc.) for which a user may need to sustain their gaze in the direction of the gaze target to achieve gaze-lock. In one example, if it is determined that the predetermined time period has not elapsed, the method 400 may return to block 402. The determination may be made based on a comparison of the timer that was started at block 412 and the predetermined time period, for example.

If it is determined that the predetermined time period has elapsed, the method 400 may proceed to block 416 where an indication is provided. The indication at block 416 may be indicative that a user has achieved gaze-lock by sustaining their gaze in the direction of the gaze target for longer than the predetermined time period. The indication at block 416 may be an audible or visual indication. In an instance in which one or more LEDs started blinking when a gaze direction was first determined to be in a direction of a gaze target, the LEDs may become fully illuminated and no longer blink at block 416. In a further example, the LEDs may first start blinking when the timer at block 412 is started and may blink increasingly rapidly while the gaze direction is in the direction of the gaze target until the LEDs are fully illuminated at block 416.

Subsequently, at block 418, a user may speak one or more voice commands that may be interpreted by the computing system as inputs for the computing system. In one instance, a user may continue to issue voice commands that will be interpreted by the computing system as long as the user sustains their gaze in the direction of the gaze target. For instance, subsequent gaze directions may be determined and compared to expected angles to determine whether the user's gaze direction is still in the direction of the gaze target. In another instance, if the user's gaze is not in the direction of the gaze target, the user may still issue voice commands for a second predetermined time period (e.g., 1.5 seconds). For example, a user may issue voice commands that will be interpreted by the system for a short period of time after initiating or having gaze-lock, even if the user does not continue to hold their gaze in the direction of the gaze target.

Figure 5:
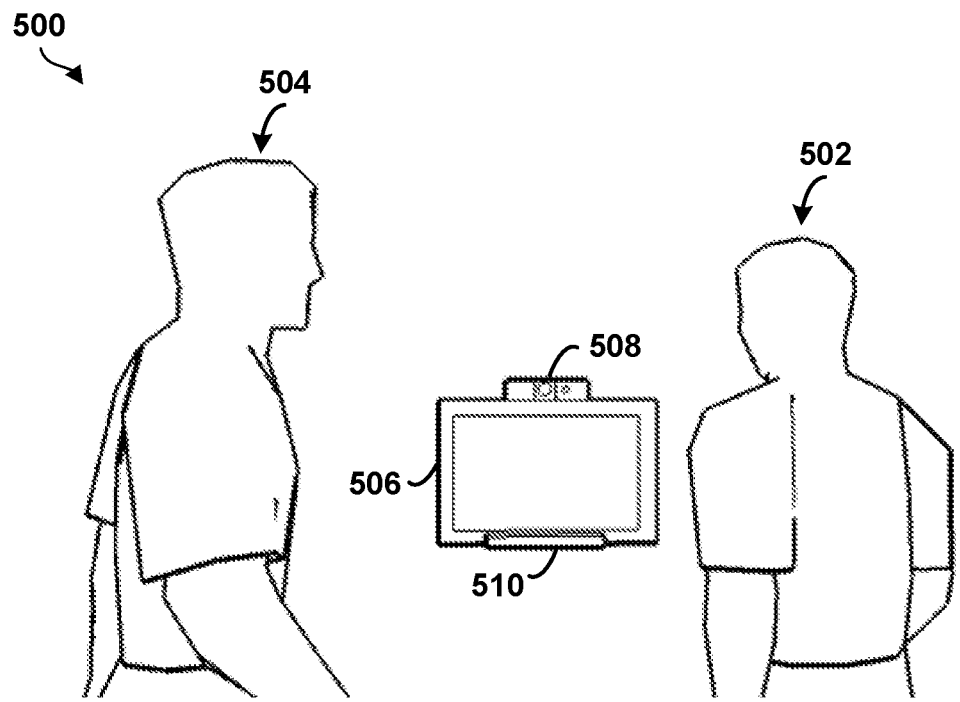
FIG. 5 illustrates an example conceptual illustration of determining multiple gaze directions.
Figure 5:
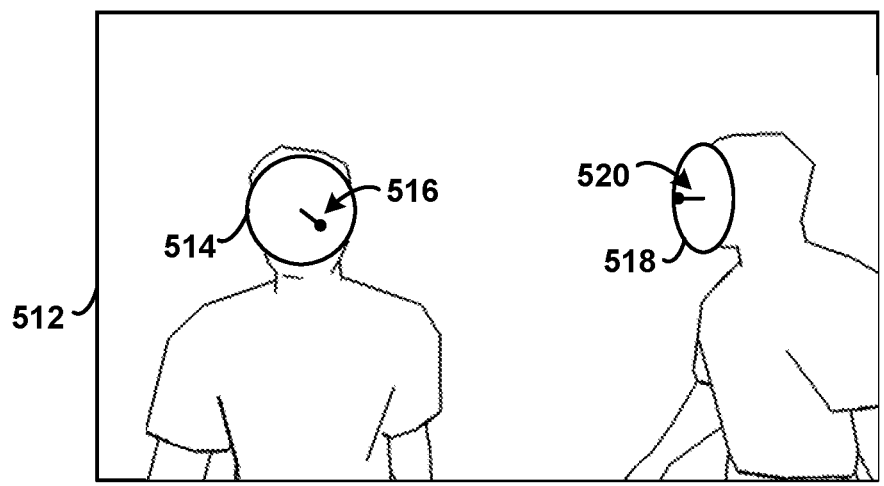

It is contemplated that the method 400 may enable voice commands to be received from multiple users based on multiple gaze directions that are determined. FIG. 5 illustrates an example conceptual illustration 500 of determining multiple gaze directions. As shown in FIG. 5, a first user 502 and a second user 504 may interact with a computing device 506 (e.g., a television or computer) using a voice-user interface. The computing device 506 of FIG. 5, as well as gaze tracking component 506 and the microphone 510 may be similar to the components described with reference to the conceptual illustration 300 of FIG. 3.

In one instance, the first user 502 may gaze in the direction of a gaze target (such as the gaze tracking component 508) while the second user may gaze in a direction that is not in the direction of the gaze target. The example image 512 illustrates an image obtained from the gaze tracking component 508 that has been processed to determine information associated with gazes of the first user 502 and the second user 504. For example, a first ellipse 514 and first vector 516 representing a gaze direction of the first user 502 are shown. Additionally, a second ellipse 518 and second vector 520 representing a gaze direction of the second user 504 are shown.

In one scenario, the first vector 516 may be in the direction of the gaze target, and the second vector 518 may not be in the direction of the gaze target. If the first user 502 has achieved gaze-lock, the computing system 506 may start to listen for voice commands. In some examples, the computing system 506 may incorporate audio localization to filter out voice commands or other speech issued by the second user (who has not achieved gaze-lock) or other background audio information.

Figure 6:
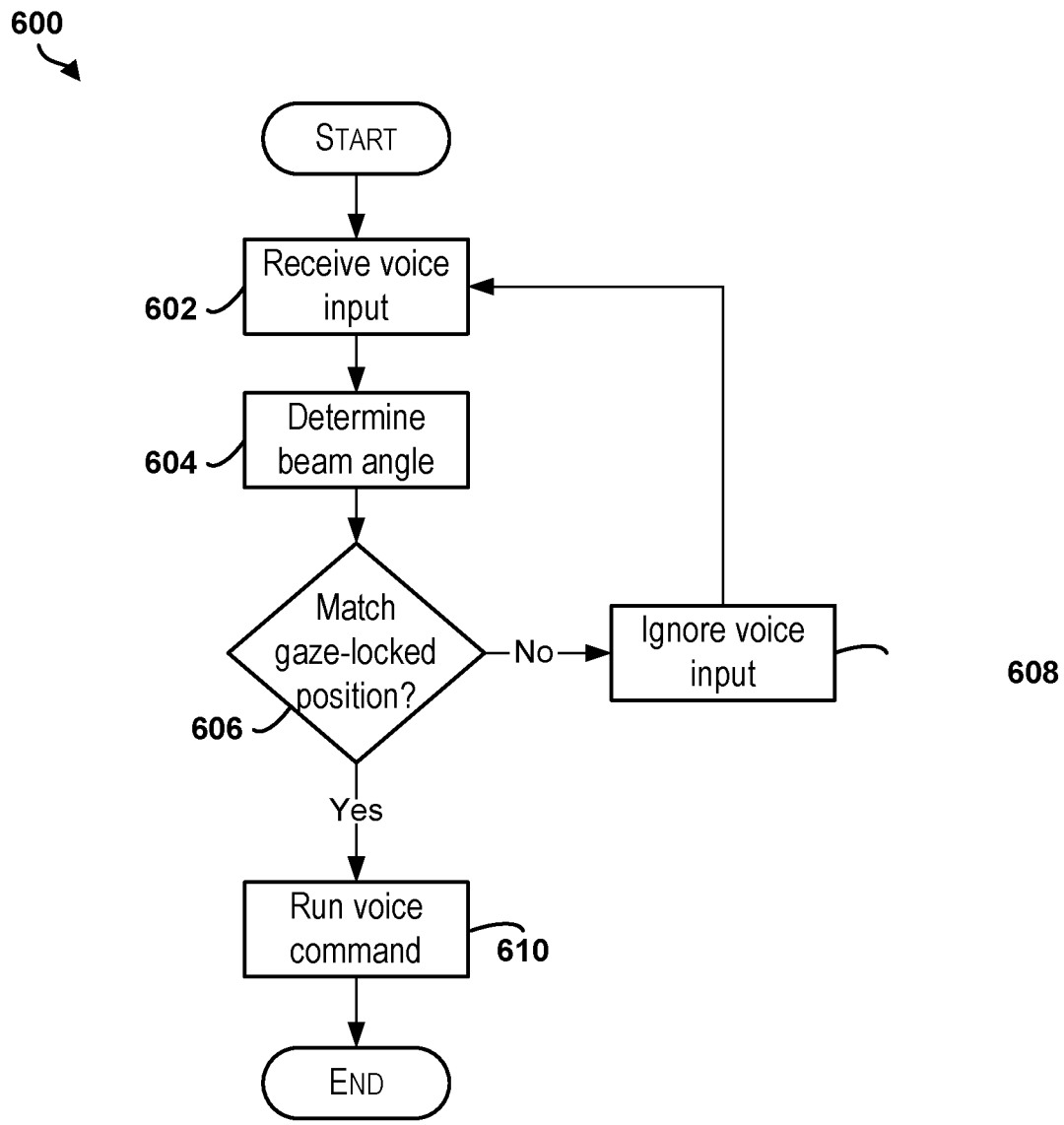
FIG. 6 is another flow chart of an example method for determining speaker intent.

FIG. 6 is another flow chart of an example method 600 for determining speaker intent. In some instances, the method 600 may enable a computing system, such as the system 100 of FIG. 1, to filter voice commands received by the computing system. For instance, the method 600 may be used to determine whether a direction to a source of a voice command matches a direction to a user who has achieved gaze-lock.

Initially, at block 602, a voice input is received. For example, a potential voice command may be received and recorded in a memory. In some examples, multiple voice inputs may be received from different audio sources (such as multiple users, or other audio sources such as televisions or radios). Each voice input may be stored as a separate entry in the memory. For example, the voice inputs may be separated based on differences in times which the voice inputs are received.

Subsequently, at block 602, a beam angle to a source of the voice input(s) may be determined. In one example, a time difference of arrival technique may be used to process inputs received from a microphone array to determine a direction to the source of a voice input. In the event that multiple voice inputs are received, separate beam angles may be determined for each of the voice inputs. At block 606, a determination may be made based on whether a beam angle matches a direction to a position from which gaze-locked has been achieved. In one instance, a beam angle may be determined to be a match to a gaze direction used to achieve gaze-lock if a difference between the gaze direction and the beam angle is less than a predetermined threshold.

If it is determined that a beam angle does not match a gaze direction that has been determined to have gaze-lock with a gaze target, at block 608, a voice input associated with the beam angle may be ignored. For example, the voice input may be speech received during a conversation between a first user, who is not looking at the gaze target and has not achieved gaze-lock, and a second user who has achieved gaze-lock. According to the method 600, at block 608, portions of the speech received from the conversation spoken by the first user may be ignored because the source of the speech (the position of the first user) does not match a position from which the gaze-lock is achieved.

If it is determined at block 606 that a beam angle associated with a voice input matches a gaze direction that has been determined to have gaze-lock with a gaze target, the method 600 may proceed to block 610. At block 610, the computing system may run voice command software to interpret the voice input as a voice command for the computing system. In some examples, multiple users may achieve gaze-lock simultaneously or during overlapping time periods. The method 600 may enable any of the multiple users to issue voice commands that may be interpreted by the computing system, since each of the multiple users has separately achieved gaze-lock, and separate beam angles may be determined for individual voice inputs issued by any of the multiple users.

Figure 7A:
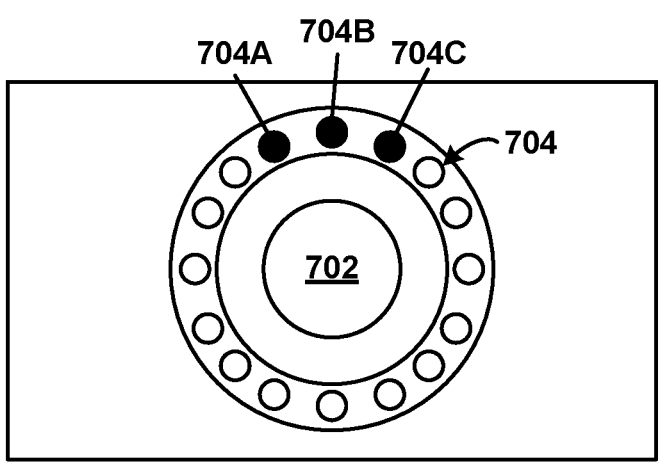
FIGS. 7A-7B illustrate example conceptual illustrations of feedback provided by an indicator component.
Figure 7B:
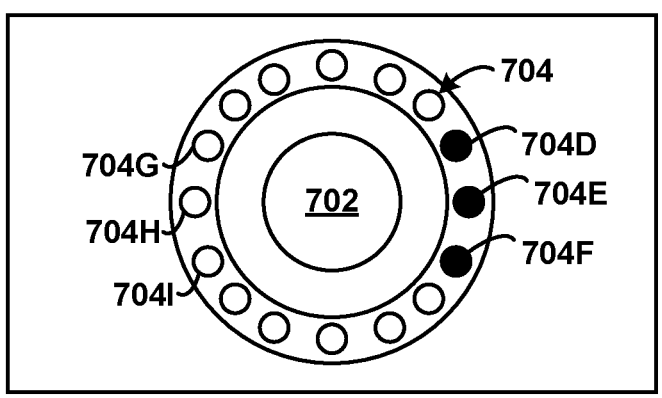

In some examples, indications provided by a computing system while a user is interacting with a voice interface may provide feedback regarding a user's gaze direction. For example, the feedback may provide information regarding a user's gaze direction as determined by the voice interface with respect to a gaze direction that would be interpreted as being in the direction of a gaze target. FIGS. 7A-7B illustrate example conceptual illustrations 700A, 700B of feedback provided by an indicator component. In one instance, a gaze target may be a camera 702 configured to determine gaze direction information. The gaze target may include a plurality of LEDs 704 that form a ring around the camera or a portion of a ring, for example.

As described previously, in one example implementation, the plurality of LEDs 704 may begin to blink when a gaze direction of a user is determined to be in the direction of the gaze target. For instance, the plurality of LEDs 704 may blink in unison, randomly, or according to a predetermined sequential pattern. The plurality of LEDs 704 may continue to blink increasingly rapidly until the user has sustained their gaze in the direction of the gaze target for longer than a predetermined time period. In some examples, when the predetermined time period has elapsed, the plurality of LEDs 704 may be illuminated fully, and stop blinking. In other examples, the plurality of LEDs may blink or caused to be illuminated having a first color after a user's gaze has been determined to be in the direction of the gaze target, and may cause to be illuminated or blink in a second color when the user has sustained their gaze in the direction of the gaze target for longer than the predetermined time period.

In one example, one or more of the plurality of LEDs 704 may blink to indicate which direction a user needs to look to achieve direct gaze with the gaze target (e.g., to be interpreted by the computing system as being in the direction of the gaze target). As shown in FIG. 7A, in an example in which a user is looking slightly below the camera 702 (e.g., such that a difference between the gaze direction and an expected angle for the user's position is less than a predetermined threshold), LEDs 704A-704C above the camera 702 may begin to blink. The blinking of LEDs 704A-704C may provide feedback that a user should look up a little bit if the user wishes for their gaze direction to be interpreted as being in the direction of the gaze target. As shown in FIG. 7B, if a user is looking slightly to the left of the camera 702, LEDs 704D-704F to the right of the camera 702 may begin to blink. The blinking of LEDs 704D-704F may provide feedback that a user should adjust their gaze direction to the right, for example.

In another example implementation, if a user is looking to the right of the camera 702, LEDs 704G-704I on the right of the camera may begin to blink indicating that the computing system is determining that the user's gaze direction is to the right of the expected angle. Various other examples and configurations are possible. The plurality of LEDs 704 may include more or less LEDs, for instance, and may be each be of the same color or different colors. In some examples, a single LED of the plurality of LEDs 704 may blink to provide feedback about the relationship between a determined gaze direction and an expected angle.

V. Example Computing Device and Computer Program Product

Figure 8:
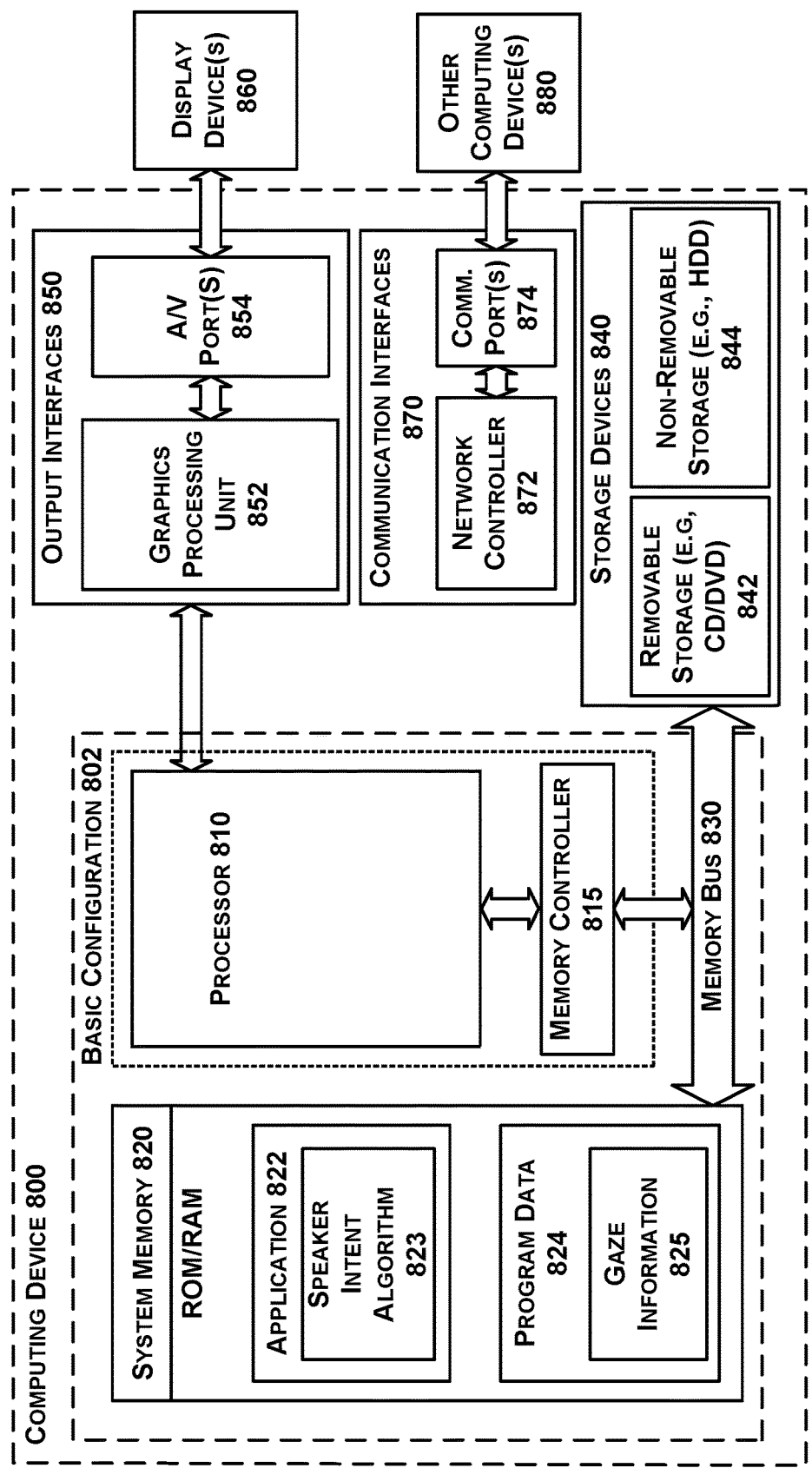
FIG. 8 is a functional block diagram illustrating an example computing device used in a computing system that is arranged in accordance with at least some embodiments described herein.

FIG. 8 is a functional block diagram illustrating an example computing device 800 used in a computing system that is arranged in accordance with at least some embodiments described herein. The computing device 800 may be a personal computer, mobile device, cellular phone, touch-sensitive wristwatch, tablet computer, or other type of computing device, and may be implemented to determine speaker intent in a voice interface as described in FIGS. 1-7. In a basic configuration 802, computing device 800 may typically include one or more processors 810 and system memory 820. A memory bus 830 can be used for communicating between the processor 810 and the system memory 820. Depending on the desired configuration, processor 810 can be of any type including but not limited to a microprocessor ($\mu P$), a microcontroller ($\mu C$), a digital signal processor (DSP), or any combination thereof. A memory controller 815 can also be used with the processor 810, or in some implementations, the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 may include one or more applications 822, and program data 824. Application 822 may include a speaker intent algorithm 823 that is arranged to provide inputs to the electronic circuits, in accordance with the present disclosure. Program data 824 may include gaze information 825 that could be directed to any number of types of data. In some example embodiments, application 822 can be arranged to operate with program data 824 on an operating system.

Computing device 800 can have additional features or functionality, and additional interfaces to facilitate communications between the basic configuration 802 and any devices and interfaces. For example, data storage devices 840 can be provided including removable storage devices 842, non-removable storage devices 844, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 820 and storage devices 840 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of computing device 800.

Computing device 800 may also include output interfaces 850 that may include a graphics processing unit 852, which can be configured to communicate to various external devices such as display devices 860 or speakers via one or more A/V ports or a communication interface 870. The communication interface 870 may include a network controller 872, which can be arranged to facilitate communications with one or more other computing devices 880 over a network communication via one or more communication ports 874. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions.

Computing device 800 can also be implemented as a personal computer including laptop computers, tablet computers, netbooks computers, and other computer configurations.

In some embodiments, the disclosed methods may be implemented as computer program instructions encoded on a non-transitory computer-readable storage media in a machine-readable format, or on other non-transitory media or articles of manufacture. FIG. 9 is a schematic illustrating a conceptual partial view of an example computer program product 900 that includes a computer program for executing a computer process on a computing device, arranged according to at least some embodiments presented herein.

In one embodiment, the example computer program product 900 is provided using a signal bearing medium 901. The signal bearing medium 901 may include one or more programming instructions 902 that, when executed by one or more processors may provide functionality or portions of the functionality described above with respect to FIGS. 1-7. In some examples, the signal bearing medium 901 may encompass a computer-readable medium 903, such as, but not limited to, a hard disk drive, a Compact Disc (CD), a Digital Video Disk (DVD), a digital tape, memory, etc. In some implementations, the signal bearing medium 901 may encompass a computer recordable medium 904, such as, but not limited to, memory, read/write (R/W) CDs, R/W DVDs, etc. In some implementations, the signal bearing medium 901 may encompass a communications medium 905, such as, but not limited to, a digital and/or an analog communication medium (e.g., a fiber optic cable, a waveguide, a wired communications link, a wireless communication link, etc.). Thus, for example, the signal bearing medium 901 may be conveyed by a wireless form of the communications medium 905 (e.g., a wireless communications medium conforming with the IEEE 802.11 standard or other transmission protocol).

The one or more programming instructions 902 may be, for example, computer executable and/or logic implemented instructions. In some examples, a computing device such as the computing device 800 of FIG. 8 may be configured to provide various operations, functions, or actions in response to the programming instructions 902 conveyed to the computing device 800 by one or more of the computer readable medium 903, the computer recordable medium 904, and/or the communications medium 905.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   operating a voice-controlled device with voice control of the voice-controlled device deactivated, wherein the voice-controlled device comprises a gaze tracking component, a light-emitting electronic component, a processor, and a microphone;
   determining, using the gaze tracking component and while the voice control of the voice-controlled device is deactivated, that a gaze direction is in a direction of a gaze target, wherein the gaze target comprises a portion of the voice-controlled device in which the gaze tracking component and the light-emitting electronic component are positioned;
   responsive to determining that the gaze direction is in the direction of the gaze target and while the voice control is deactivated, transmitting by the processor, a first signal to the light-emitting electronic component that causes the light-emitting electronic component to output a first visual indication that: the gaze direction is in the direction of the gaze target, the voice control is deactivated, and maintaining the gaze direction in the direction of the gaze target for the predetermined time period will activate the voice control;
   responsive to determining that the gaze direction is in the direction of the gaze target, determining, using the gaze tracking component of the voice-controlled device and while the voice control is deactivated, that the predetermined time period has elapsed while the gaze direction is in the direction of the gaze target; and
   responsive to determining that the predetermined time period has elapsed while the gaze direction is in the direction of the gaze target:
      activating the voice control of the voice-controlled device, wherein activating the voice control comprises configuring the voice-controlled device such that voice commands that are subsequently received by the microphone are interpreted as inputs for the voice-controlled device, and
      transmitting, by the processor, a second signal to the light-emitting electronic component that causes the light-emitting electronic component to output a second visual indication that the voice control is activated; and
   processing a voice command that is received by the microphone after activating the voice control.

2. The method of claim 1, wherein activating the voice control comprises switching the microphone from an off-state to an on-state.

3. The method of claim 1, further comprising:
   determining, using audio localization, a voice direction; and
   determining that the voice command is an input for the voice-controlled device based on the voice direction matching the gaze direction.

4. The method of claim 1, wherein the gaze direction corresponds to a gaze of a user, and wherein the voice-controlled device is located remotely from the user.

5. The method of claim 1, wherein determining, using the gaze tracking component, that the gaze direction is in the direction of the gaze target comprises:
   determining, using a camera, that the gaze direction is in the direction of the gaze target.

6. The method of claim 5, wherein the camera is positioned on the voice-controlled device such that a user of the voice-controlled device is within a field of view of the camera when the voice-controlled device is in use, and wherein the light-emitting electronic component is positioned on the device such that the first visual indication and the second visual indication are perceivable by the user when the user is within the field of view of the camera.

7. A method comprising:
operating a voice-controlled device with voice control of the voice-controlled device deactivated, wherein the voice-controlled device comprises a processor and a microphone;
determining, using a gaze tracking component and while the voice control of the voice-controlled device is deactivated, that a gaze direction is in a direction of a gaze target;
responsive to determining that the gaze direction is in the direction of the gaze target and while the voice control is deactivated, transmitting, by the processor, to a light-emitting electronic component a first signal that causes the light-emitting electronic component to output a first visual indication that indicates that: the gaze direction is in the direction of the gaze target, the voice control is deactivated, and maintaining the gaze direction in the direction of the gaze target for a predetermined time period will activate the voice control;
after providing the first visual indication and while the voice control is deactivated, determining, using the gaze tracking component, that the predetermined time period has elapsed while the gaze direction is in the direction of the gaze target;
responsive to determining that the predetermined time period has elapsed while the gaze direction is in the direction of the gaze target:
activating the voice control of the voice-controlled device, wherein activating the voice control comprises configuring the voice-controlled device such that voice commands that are subsequently received by the microphone are interpreted as inputs for the voice-controlled device, and
transmitting, by the processor, a second signal to the light-emitting electronic component that causes the light-emitting electronic component to output a second visual indication that indicates that the voice control is activated; and
processing a voice command that is received by the microphone after activating the voice control.

8. The method of claim 7, wherein the gaze direction corresponds to a gaze of a user, and wherein the gaze tracking component is located remotely from the user.

9. The method of claim 7, wherein the gaze tracking component is a component of the voice-controlled device.

10. The method of claim 9, wherein the gaze direction corresponds to a gaze of a user, and wherein the voice-controlled device is located remotely from the user.

11. The method of claim 7, wherein the gaze target is the gaze tracking component.

12. The method of claim 7, wherein the gaze target is a physical target that is separate from the gaze tracking component and located at a known position with respect to the gaze tracking component.

13. The method of claim 7, wherein the gaze target is a virtual target that is located at a known position with respect to the gaze tracking component.

14. The method of claim 7, further comprising continuously providing the first visual indication as feedback while the gaze direction is in the direction of the gaze target until determining that the predetermined time period has elapsed.

15. A voice-controlled device comprising:
a microphone;
one or more processors; and
instructions stored in a memory and executable by the processor to:
operate a voice-controlled device with voice control of the voice-controlled device deactivated,
determine, using a gaze tracking component and while the voice control of the voice-controlled device is deactivated, whether a gaze direction is in a direction of a gaze target,
upon determining that the gaze direction is in the direction of the gaze target and while the voice control is deactivated, transmit a first signal to a light-emitting electronic component that causes the light-emitting electronic component to output a first visual indication that: the gaze direction is in the direction of the gaze target, the voice control is deactivated, and maintaining the gaze direction in the direction of the gaze target for a predetermined time period will activate the voice control,
upon determining that the predetermined time period has elapsed while the gaze direction is in the direction of the gaze target, (i) activate the voice control, wherein activating the voice control comprises configuring the voice-controlled device such that voice commands that are subsequently received by the microphone are interpreted as inputs for the voice-controlled device and (ii) transmit a second signal to the light-emitting electronic component that causes the light-emitting electronic component to output a second visual indication that indicates that the voice control is activated, and
processing a voice command that is received by the microphone after activating the voice control.

16. The voice-controlled device of claim 15, wherein the gaze tracking component is a component of the voice-controlled device, and wherein the gaze target comprises a portion of the voice-controlled device in which the gaze tracking component and the light-emitting electronic component are positioned.

17. The voice-controlled device of claim 15, wherein the gaze target is the gaze tracking component.

* * * * *